United States Patent
Obana et al.

(10) Patent No.: US 10,627,703 B2
(45) Date of Patent: Apr. 21, 2020

(54) ELECTRONIC APPARATUS COMPRISING DRIVEN BODY DRIVEN BY ACTUATOR, IMAGE PICKUP APPARATUS, AND MOVING BODY

(71) Applicant: CANON KABUSHIKI KAISHA, Tokyo (JP)

(72) Inventors: Shinji Obana, Kunitachi (JP); Ayumu Nemoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/995,886

(22) Filed: Jun. 1, 2018

(65) Prior Publication Data
US 2018/0348595 A1 Dec. 6, 2018

(30) Foreign Application Priority Data
Jun. 2, 2017 (JP) ................................. 2017-110106

(51) Int. Cl.
*G03B 17/02* (2006.01)
*B64D 47/08* (2006.01)
(Continued)

(52) U.S. Cl.
CPC ............. *G03B 17/02* (2013.01); *B64D 47/08* (2013.01); *G03B 17/561* (2013.01); *H04N 5/225* (2013.01);
(Continued)

(58) Field of Classification Search
CPC .. B64C 2201/127; B64D 47/08; G03B 17/02; H04N 5/225
See application file for complete search history.

(56) References Cited

U.S. PATENT DOCUMENTS 7,812,507 B2 * 10/2010 Takahashi ............ H02N 2/0025
310/328
2001/0055487 A1 * 12/2001 Akada .................... G03B 17/00
396/427
(Continued)

FOREIGN PATENT DOCUMENTS

JP 2009058870 A 3/2009
JP 2014212392 A 11/2014
JP 2016082463 A 5/2016

OTHER PUBLICATIONS

Extended European Search Report issued in European Appln. No. 18174711.4 dated Nov. 6, 2018.
(Continued)

*Primary Examiner* — Amy R Hsu
(74) *Attorney, Agent, or Firm* — Rossi, Kimms & McDowell LLP

(57) ABSTRACT

A downsizable electronic apparatus is provided. A supporting unit supports a driven body and has a shaft portion, and a rotation plate which is arranged coaxially with and perpendicular to the shaft portion and has a sliding surface with the shaft portion at its center and a scale arranged coaxially with the slicing surface and at an outer peripheral side in the rotation plate. A base unit, on which the supporting unit is provided in a standing manner, has a control substrate, an actuator drives the supporting unit and is arranged so as to be brought into pressure contact with the sliding surface, and a position detecting unit detects a rotational position of the supporting unit and reads the scale, and rotatably supports the supporting unit. Wiring drawn from the driven body is inserted into a wiring region and connected to the control substrate.

17 Claims, 12 Drawing Sheets

(51) Int. Cl.
    *H04N 5/225*     (2006.01)
    *G03B 17/56*     (2006.01)
    *H04N 5/232*     (2006.01)
    *G03B 15/00*     (2006.01)
(52) U.S. Cl.
    CPC ....... *H04N 5/2251* (2013.01); *H04N 5/23299* (2018.08); *B64C 2201/127* (2013.01); *G03B 15/006* (2013.01); *G03B 2205/0061* (2013.01)

(56) References Cited

U.S. PATENT DOCUMENTS

| | | |
|---|---|---|
| 2006/0133786 A1 | 6/2006 | Teramoto |
| 2010/0051774 A1* | 3/2010 | Shi ................. F16M 11/10 248/349.1 |
| 2011/0234041 A1 | 9/2011 | Kanazawa |
| 2015/0097950 A1* | 4/2015 | Wang ............... H04N 5/23287 348/144 |
| 2017/0048439 A1* | 2/2017 | von Borcke-Morawitz ............... G01C 21/18 |

OTHER PUBLICATIONS

Copending U.S. Appl. No. 15/995,722, filed Jun. 1, 2018.
Office Action issued in U.S. Appl. No. 15/995,722 dated Jul. 3, 2019.

* cited by examiner

ELECTRONIC APPARATUS COMPRISING DRIVEN BODY DRIVEN BY ACTUATOR, IMAGE PICKUP APPARATUS, AND MOVING BODY

BACKGROUND OF THE INVENTION

Field of the Invention

The present invention relates to an electronic apparatus comprising a driven body driven by an actuator, an image pickup apparatus, and a moving body.

Description of the Related Art

In recent years, compact cameras called action cams or wearable cameras have been widespread (For example, see, Japanese Laid-Open Patent Publication (Kokai) No. 2016-82463). Such cameras are mounted not only on a body of a photographer but also on a bicycle or a drone (unmanned aircraft) as a moving body, and take movies while the moving body is moving.

FIGS. 13A and 13B are diagrams showing how to mount a conventional compact camera to a drone. FIG. 13A is an exploded view for use in explaining a mounting arrangement of the camera, and FIG. 13B is a perspective view of the drone to which the camera is mounted. In FIGS. 13A and 13B, a drone 1 is comprised of a quadcopter having a plurality, for example, four propellers, and stably holds (hovers) an airframe (main body) thereof in the air. The drone 1 is also capable of changing its posture by making the number of rotation of the propellers imbalanced to change a balance of the airframe. A compact camera 2 mounted on the drone 1 is comprised of an action cam. The camera 2 is equipped with an optical lens unit capable of performing relatively wide-angle shooting. The camera 2 is held by a gimbal 3, which is a holding member. The gimbal 3 is fixed to the drone 1 by screws 4, and the camera 2 is fixed to the gimbal 3 by a fixing member, not shown. For example, an adhesive double-sided tape and a bonding band are used as the fixing member. A posture stabilizing mechanism (not shown) which stabilizes the posture of the fixed camera 2 is built in the gimbal 3. The posture stabilizing mechanism controls movement of the camera 2 in a panning (horizontal) direction, a tilting (vertical) direction, and a rolling (rotating) direction, and eliminates an effect of a swing of the drone 1 on an image shot by the camera 2.

In order to change a direction in which the camera 2 of the drone 1 in FIGS. 13A and 13B shoots an image (herein after, referred to "the shooting direction"), it is necessary to change an orientation of a main body of the drone 1 as well as the gimbal 3, which imposes inconvenience on an operator of the drone 1. When the camera 2 is mounted on a handle of a bicycle, it is necessary to change an orientation of the handle in order to change the shooting direction, which also imposes inconvenience on a rider of the bicycle. Further, when the camera 2 is mounted on a body of a photographer, it is necessary to change an orientation of the body in order to change the shooting direction, which, after all, imposes inconvenience on the photographer.

Accordingly, a camera which is capable of moving widely a lens barrel in a panning direction and a tilting direction has been proposed (for example, see, Japanese Laid-Open Patent Publication (Kokai) No. 2014-212392). The camera disclosed in Japanese Laid-Open Patent Publication (Kokai) No. 2014-212392 comprises a tilt unit including the lens barrel, and a pan unit including the tilt unit, which are electrically driven by a tilt driving unit and a pan driving unit, respectively.

In the camera in Japanese Laid-Open Patent Publication (Kokai) No. 2014-212392, however, in order to realize smooth horizontal rotation of the pan unit, an electric connecting portion comprised of wire harness is drawn from a side of the pan unit. The drawn electric connecting portion is wound with the pan unit, which horizontally rotates, and bends and protrudes from the side of the electric connecting portion if an amount of winding is small. Therefore, the electric connecting portion occupies a predetermined area in a plan view. As a result, in particular in a plan view, a camera cannot be downsized, which may decrease a degree of freedom of how to attach the image pickup apparatus to the drone or the handle of the bicycle.

SUMMARY OF THE INVENTION

The present invention provides a downsizable electronic apparatus, image pickup apparatus, and a moving body.

Accordingly, the present invention provides An electronic apparatus comprising a driven body, a supporting unit that supports the driven body, and a base unit on which the supporting unit is provided in a standing manner, wherein the base unit has a control substrate, an actuator that drives the supporting unit, and a position detecting unit that detects a rotational position of the supporting unit, the supporting unit has a cylindrical shaft portion, and a rotation plate arranged coaxially with and perpendicular to the shaft portion, the base unit rotatably supports the supporting unit by fitting the shaft portion into a hole of the base unit, wiring drawn from the driven body is inserted into a wiring region comprised of a hollow portion of the shaft portion and connected to the control substrate, the rotation plate has an annular sliding surface formed with the shaft portion at its center, and a scale arranged coaxially with the sliding surface, the actuator is arranged so as to be brought into pressure contact with the sliding surface, the position detecting unit reads the scale, and the scale is arranged at an outer peripheral side of the rotation plate than the sliding surface.

According to the present invention, the wiring drawn from the driven body is inserted into the wiring region comprised of the hollow portion of the cylindrical shaft portion of the supporting unit and connected to the control substrate of the base unit. Therefore, it is unnecessary to drawn the wiring from a side of the supporting unit. Consequently, the drawn wiring does not bent and protrude from the side of the supporting unit while the supporting unit is rotating, and thus the electronic apparatus can be downsized in the plan view compared to a case where wiring is drawn from a side of a supporting unit.

Further features of the present invention will become apparent from the following description of exemplary embodiments (with reference to the attached drawings).

DESCRIPTION OF THE EMBODIMENTS

Figure 1A:
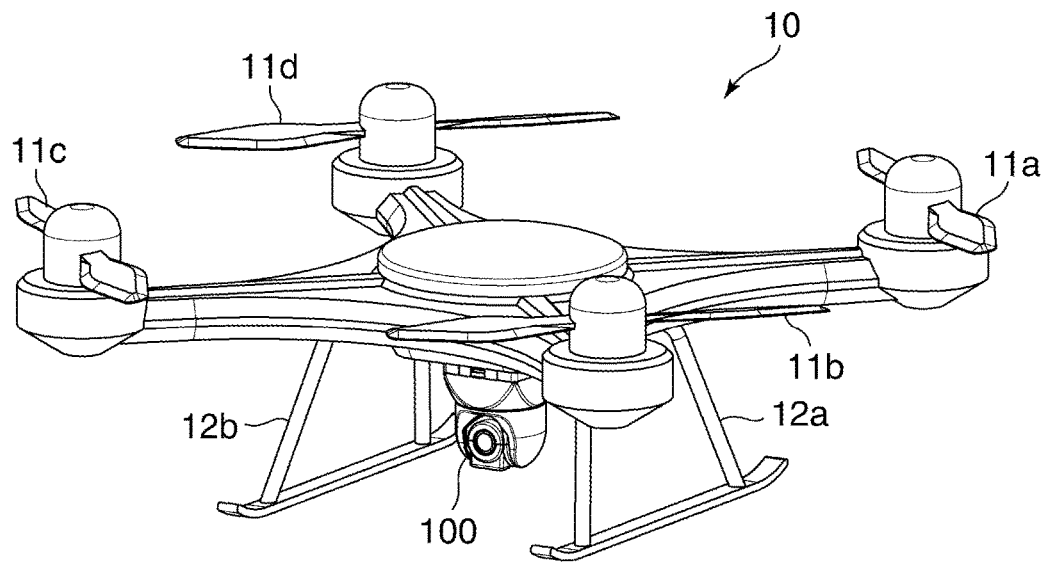
FIGS. 1A and 1B are views schematically showing an arrangement of a drone equipped with a camera as an image pickup apparatus according to an embodiment of the present invention.

Hereinafter, a detailed description will be given of embodiments of the present invention by referring to the drawings. In the present embodiments, although a case where the present invention is applied to a camera as an image pickup apparatus which is mounted on a drone (moving body) as an unmanned aircraft will be explained, an application of the present invention is not limited to this. The present invention may be applied to general electronic apparatuses having a driven body which is driven by an actuator. The camera, to which the present invention is applied, can be mounted not only on a drone but another moving body (automobile or bicycle), and further on a body of a photographer.

Figure 1B:
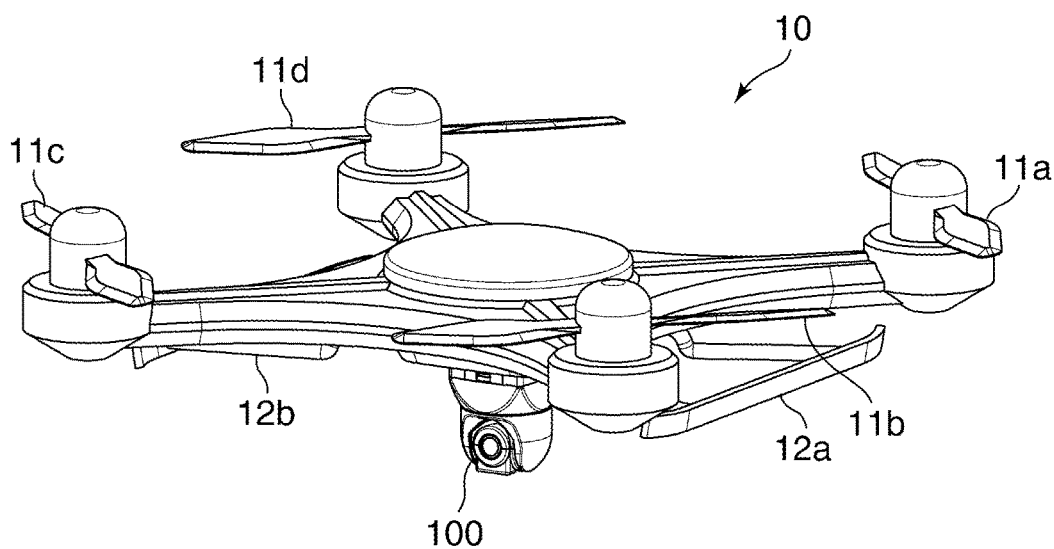

FIGS. 1A and 1B are views schematically showing an arrangement of a drone 10 equipped with a camera 100 as an image pickup apparatus according to the present embodiment. FIG. 1A shows the drone 10 in a landing state, and FIG. 1B shows the drone 10 in a flying state.

In FIGS. 1A and 1B, the done 10 has four propellers 11a to 11d (hereinafter, collectively referred to as "propellers 11") (flying mechanism). The number of propellers varies according to a size, a weight, and an intended use, and so on of the drone 10. The drone 10 in FIG. 1 is comprised of a quadcopter having four propellers and flies by a lift force generated by the rotating propellers 11. By making the number of rotation of all the propellers 11 the same, a body of the drone 10 hovers in the air, and by making the number of rotation of the propellers 11 imbalanced, a balance of the body of the drone 10 is changed to change a posture of the drone 10.

A camera 100 (electronic apparatus) is mounted on the drone 10. The camera 100 is mounted on the drone 10 by using, for example, an adhesive double-sided tape or a bonding band. The camera 100 may be mounted on the drone 10 by using a fitting tool such as an attachment. It should be noted that although a location in the drone 10 on which the camera 100 is mounted is not limitative, the camera 100 is mounted in a vicinity of a center or a lower part of the body of the drone 10 in terms of ease of shooting or consideration of a weight balance. The drone 10 also has skids 12a, 12b which is a pair of landing legs. The skids 12a, 12b are constructed in a foldable manner, protrude downwardly from the drone 10 at landing (FIG. 1A), and are pulled up toward the body of the drone 10 while flying (FIG. 1B). Consequently, the camera 100 mounted on the lower part of the body is prevented from being in contact with a ground and the like at landing, and the camera 100 is prevented from shooting the skid 12a, 12b while flying.

Figure 2:
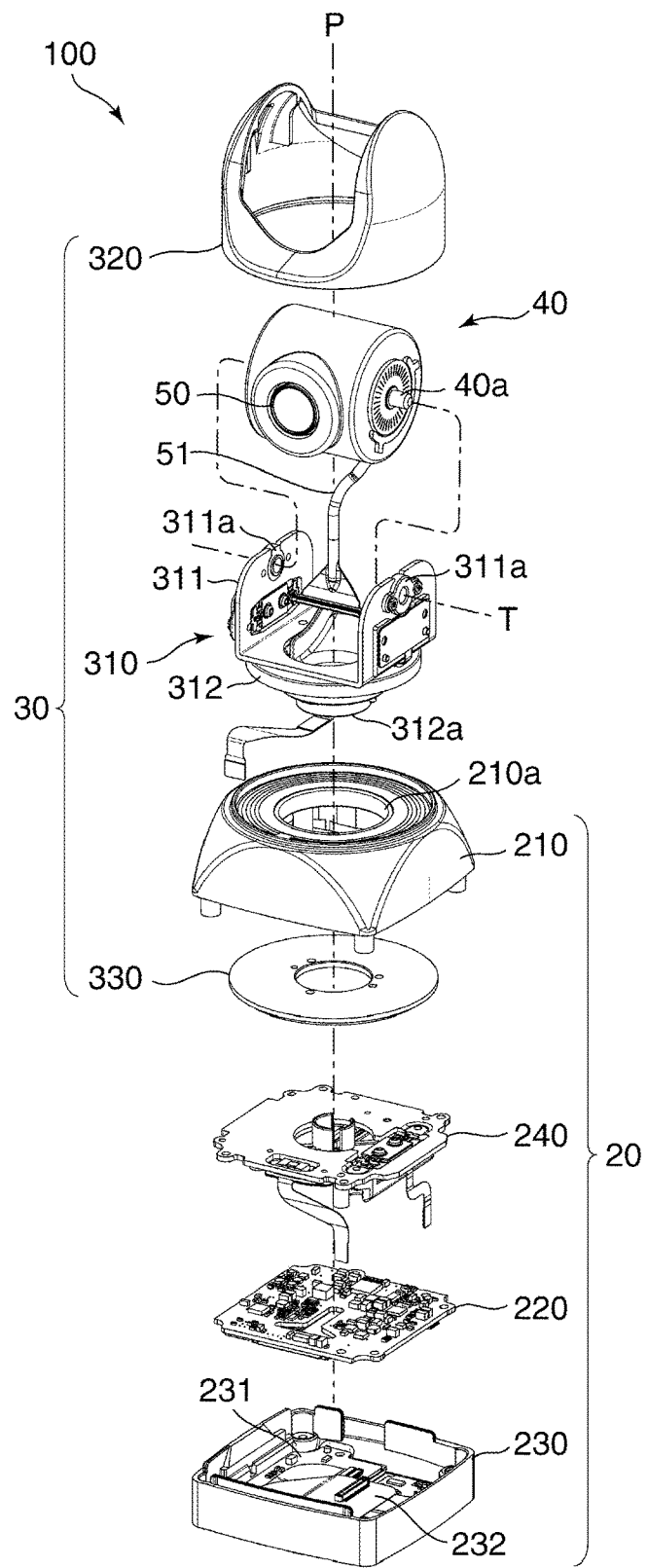
FIG. 2 is an exploded perspective view schematically showing an arrangement of the camera in FIG. 1.
Figure 3A:
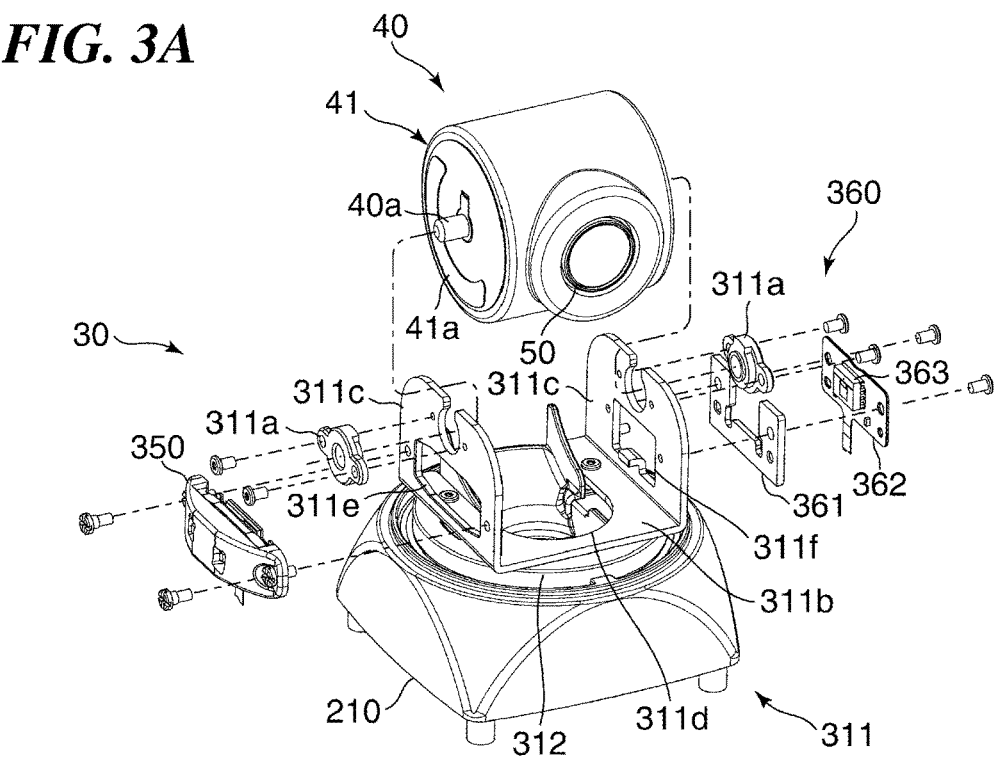
FIGS. 3A and 3B are exploded perspective views showing an arrangement of a panning unit of the camera in FIG. 2.
Figure 3B:
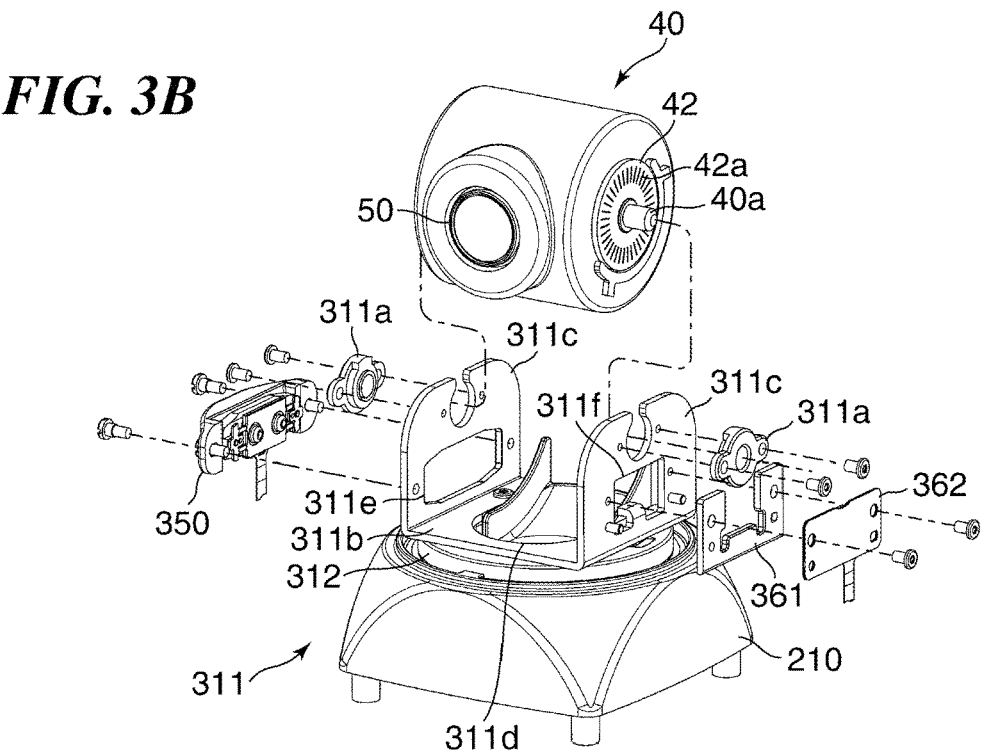

FIG. 2 is an exploded perspective view schematically showing an arrangement of the camera 100 in FIGS. 1A and 1B. FIGS. 3A and 3B are exploded perspective views showing an arrangement of a panning unit 30 of the camera 100 in FIG. 2. Particularly, FIGS. 3A and 3B show the arrangements of the panning unit 30 when viewed from respectively different diagonal directions.

In FIGS. 2, 3A, and 3B, the camera 100 has a base unit 20, the panning unit 30 (the supporting unit), and the tilting unit 40 which holds the lens unit 50 (driven body, image pickup unit). It should be note that in the present embodiment, the tilting unit 40 is abbreviated as "the tilt unit", and the panning unit 30 is abbreviated as "the pan unit" hereinafter. The pan unit 30 is placed on the base unit 20 in a horizontally rotatable (panning-enabled) manner, and the tilt unit 40 is installed to the pan unit 30 in a vertically rotatable (tilting-enabled) manner. An axis P in FIG. 2 indicates a central axis (rotational axis of the supporting unit) of horizontal rotation of the pan unit 30, and an axis T in FIG. 2 indicates a central axis of vertical rotation of the tilt unit 40. The axis P and the axis T intersect perpendicularly with each other. The lens unit 50 has an image pickup optical system and shoots a subject. Even when a flying posture of the drone 10 is stabilized while the drone 10 is flying, the subject can be shot from a variety of directions and angles by rotating the lens unit 50 horizontally or vertically by the pan unit 30 or the tilt unit 40. The camera 100 further has a wireless communication unit (not shown). The camera 100 receives an operation from an external device via the wireless communication unit. For example, the camera 100 receives operations such as remote shooting, transfer of a shot image, and so on from a terminal device such as a smartphone.

The base unit 20 is equipped with a base cover 210, a control substrate 220, a bottom cover 230, and a main chassis 240. The control substrate 220 is equipped with a CPU which performs image processing, memory, and a driver IC which performs driving control for the pan unit 30 and the tilt unit 40. The bottom cover 230 is equipped with a recording portion 231 and a flexible printed circuit (hereinafter, referred to as "the FPC") 232. The recording portion 231 is, for example, a printed substrate mounting a connector in which a non-volatile memory of a card type can be accommodated, and is electrically connected to the control substrate 220 by the FPC 232. The camera 100 records a shot image by writing image data generated through image processing into the non-volatile memory mounted on the recording portion 231.

A pan unit 30 has a pan base 310, a pan cover 320, and a pan rotation plate 330. The pan base 310 has a pan chassis 311 formed by bending a plate metal through press working in a U-shape, and a disk-shaped panning base 312 made of resin which has been subjected to mold injection or the like. The pan chassis 311 is fixed to the panning base 312 by screws. The tilt unit 40 is comprised of cylindrical members arranged along a horizontal direction. A pair of tilt rotation supporting portions 311a, which are pivotally supporting members, including through holes are fastened by screws in a vicinity of an upper end of the pan chassis 311. The tilt rotation supporting portions 311a are formed by mold-injecting a resin having low friction and superior sliding characteristics (for example, polyacetal (POM) and the like). It should be noted that a rolling bearing such as a ball bearing and a roller bearing may be used as the tilt rotation supporting portions 311a. A tilt shaft portion 40a which protrudes from each surface of the tilt unit 40 along an axis T is fitted to each of the tilt rotation supporting portions 311a. As a result, the tilt unit 40 is held by the pan chassis 311 and supported by the pan unit 30 in a rotatable (vertically rotatable) manner with the axis T at its central axis. The panning base 312 has a tubular pan shaft portion 312a which protrudes downwardly, and the pan shaft portion 312a is fitted to a pan rotation supporting portion 210a, which is a pivotally supporting member, including a through hole (hole portion) drilled in the base cover 210 along the axis P. By fastening the pan rotation plate 330 comprised of a disk-shaped member to the panning base 312 on an inner side of the base cover 210, the pan unit 30 is placed on the base cover 210 in a rotatable (horizontally rotatable) manner with the axis P at its central axis. Wiring 51 is drawn from the lens unit 50, and the lens unit 50 is electrically connected to the control substrate 220 by the wiring 51. A detail of a wiring configuration of the wiring 51 will be described later. The wiring 51 is comprised of, for example, a plurality of electric wires formed by covering a conducting core with an insulator, a connector which is connected to both ends of the plurality of the electric wires, and an adhesive tape which bundles the plurality of electric wires over a certain length. The electric wire used for the wiring 51 may be, for example, a coaxial cable comprised of an inner conductor, an insulator, an external conductor, and a protective coating.

The pan chassis 311 comprised of the U-shaped member is comprised of a base portion 311b having a flat surface fasted to the panning base 312 by screws, and a pair of arm portions 311c which substantially vertically stands with respect to the base portion 311b. A tilt rotation plate 41 is fixed to one side face of the tilt unit 40 by screws. A tilt reflection scale 42 is attached to the other side of the tilt unit 40 by a double-sided tape 40b. When the tilt unit 40 is supported by the pan unit 30, the tilt rotation plate 41 and the tilt reflection scale 42 face each of the arm portions 311c. An opening 311d is formed in the base portion 311b, and an opening 311e and an opening 311f are formed in the arm portions 311c. It should be noted that the opening 311e and the opening 311f may be comprised of holes formed in the arm portions 311c, and may be formed by cutting a part of the arm portions 311c. The wiring 51 which extends from the tilt unit 40 is inserted into the opening 311d. In the pan chassis 311, a tilt driving unit 350 (actuator), to be described later, is arranged so as to enter the opening 311e, and a tilting position detecting unit 360, to be described later, is arranged so as to enter the opening 311f.

In the camera 100, the control substrate 220 is fixed to the base cover 210 after the pan unit 30 and the tilt unit 40 are installed to the base cover 210. A plurality of connectors is mounted on the control substrate 220, and the FPCs which extend respectively from the tilt driving unit 350 and the tilting position detecting unit 360 as well as the wiring 51 are connected to the control substrate 220. The recording portion 231 is assembled to the bottom cover 230 in advance. A connector for connecting the FPC is mounted on the recording portion 231. One end of the FPC 232 is connected to the connector, and the other end of the FPC 232 is connected to a connector arranged in the control substrate 220 before the bottom cover 230 is assembled to the base cover 210. The bottom cover 230 is fixed to the base cover 210 by screws.

The tilt driving unit 350 is an actuator comprised of a so called ultrasonic motor which drives the driven body by using ultrasonic vibration. In a case where the ultrasonic motor is used, it is necessary for the ultrasonic motor to be in pressure contact with the driven body in order to transmit a driving force to the driven body. As will be described later, in the present embodiment, the tilt driving unit 350 is in pressure contact with the tilt unit 40.

Figure 4:
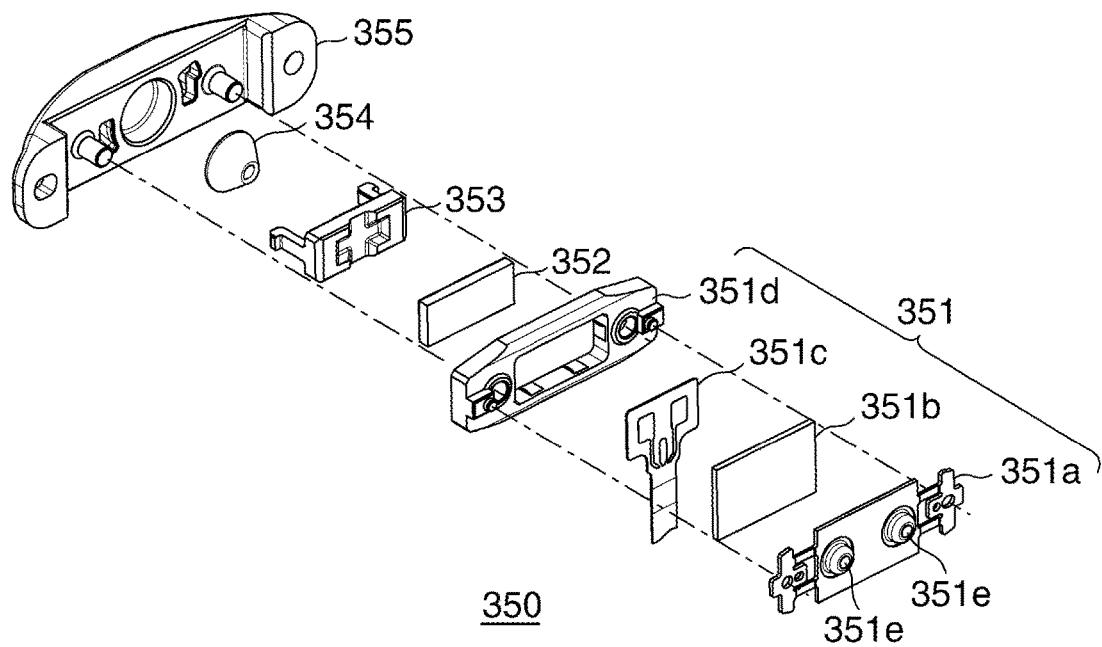
FIG. 4 is an exploded perspective view schematically showing an arrangement of a tilt driving unit.

FIG. 4 is an exploded perspective view schematically showing an arrangement of the tilt driving unit 350. In FIG. 4, the tilt driving unit 350 has a driving unit 351, a felt 352, a presser 353, a spring 354, and a case 355. The driving unit 351 has an oscillator 351a, a piezoelectric element 351b, an FPC 351c which is a wiring member, and a base member 351d. The piezoelectric element 351b gives ultrasonic vibration to the oscillator 351a, and the FPC 351c is adhesively fixed to the piezoelectric element 351b to apply a high frequency voltage to the piezoelectric element 351b. The base member 351d holds the oscillator 351a, the piezoelectric element 351b, and the FPC 351c, and brings the oscillator 351a into pressure contact with the tilt unit 40 when the tilt driving unit 350 is attached to the arm portion 311c of the pan chassis 311. The FPC 351c is directly connected to the control substrate 220, and applies an arbitrary high frequency voltage to the piezoelectric element 351b depending on a control signal from the driver IC. The oscillator 351a has contact points 351e comprised of a plurality of projections. When the high frequency voltage is applied to the piezoelectric element 351b, vibration with an arbitral frequency is excited in the oscillator 351a, which generates a driving force to drive the driven body in an arrangement direction of the contact points 351e. Because the oscillator 351a is in pressure contact with the tilt unit 40, the driving force is transmitted to the tilt unit 40, and the tilt unit 40 is relatively moved with respect to the tilt driving unit 350.

In tilt driving unit 350, the case 355 is fixed to the arm portion 311c by screws, and the spring 354 supported by the case 355 presses the driving unit 351 via the felt 352 and presser 353. The presser 353 is arranged in an interior of the base member 351d of the driving unit 351, slidably moves in a direction parallel to the axis T, and transmits a local pressing force of the spring 354 over a wide range. Accordingly, in the tilt driving unit 350, the oscillator 351a is pressed without being tilted, and the plurality of contact points 351e of the driving unit 351 is equally pressed against the tilt unit 40. The felt 352 is arranged between the presser 353 and the driving unit 351, attenuates vibration generated by the oscillator 351a, and prevents the vibration from being transmitted to the presser 353 and the spring 354. The tilt driving unit 350 is attached to the arm portion 311c so that at least the contact points 351e enter the opening 311e of the arm portion 311c.

Referring again to FIGS. 2, 3A, and 3B, the tilt rotation plate 41 is fixed to the one side face of the tilt unit 40, and the contact points 351e are in pressure contact with a frictional sliding surface 41a of the tilt rotation plate 41 as described above. The frictional sliding surface 41a is subjected to a surface treatment such as lapping, and a highly flat and smooth plane is formed. Stainless material subjected to a hardening treatment such as nitriding is used for the tilt rotation plate 41. Accordingly, the tilt rotation plate 41 achieves stable contact and low wear amount of the contact points 351e at the same time. It should be noted that a cementation process in which carbons are added to a surface of the frictional sliding surface 41a and hardened, for example, may be used as the hardening treatment for the tilt rotation plate 41.

The tilting position detecting unit 360 has a spacer 361 and an FPC 362 (another wiring), and a tilt optical sensor 363 and a connector 362a (FIG. 9) are mounted on the FPC 362. The FPC 362 is fixed to the arm portion 311c by screws via the spacer 361 so that a part of the tilt optical sensor 363 enters the opening 311f of the arm portion 311c. As described above, the tilt reflection scale 42 is provided on the other side face of the tilt unit 40, and the tilting position detecting unit 360 is attached to the arm portion 311c so that the tilt optical sensor 363 and the tilt reflection scale 42 face with each other with a predetermined space sandwiching therebetween. The FPC 362 is connected to the control substrate 220, and outputs a detection result of the tilt optical sensor 363 to the CPU. The tilt reflection scale 42 has an optical grid 42a comprised of a plurality of contrast patterns arranged in a circumference direction around the tilt shaft portion 40a at constant intervals. A resin such as acryl (PMMA) or polycarbonate (PC) is used for a base material of the tilt reflection scale 42. In the tilt reflection scale 42, the optical grid 42a comprised of an aluminum film, for example, is formed as a reflection film on a surface of the base material. It should be noted that the base material for the tilt reflection scale 42 is not limited to the above materials, and quartz glass, blue sheet glass, or silicon wafer, for example, may be used for the base material. Chromium film, for example, may be used for the optical grid 42a.

Figure 5A:
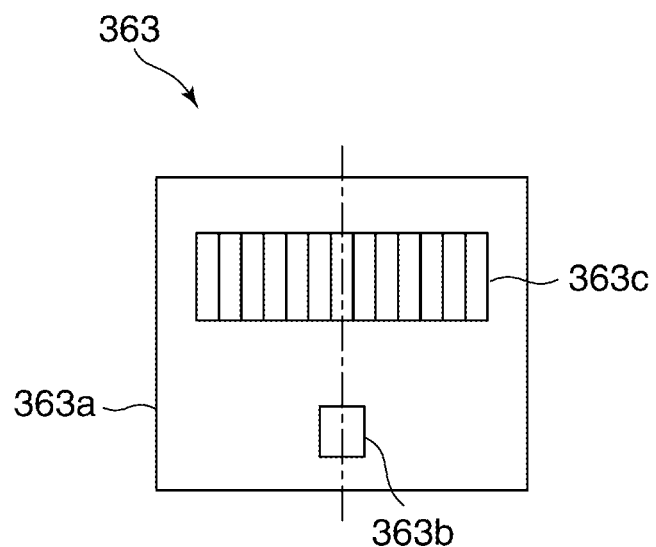
FIGS. 5A and 5B are views schematically showing an arrangement of a tilt optical sensor of a tilting position detecting unit.
Figure 5B:
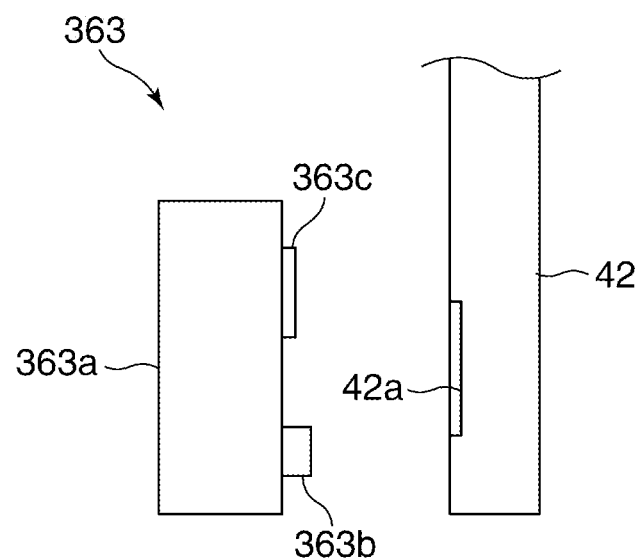

FIGS. 5A and 5B are views schematically showing an arrangement of the tilt optical sensor 363 of the tilting position detecting unit 360. FIG. 5A is a view of the tilt optical sensor 363 as viewed from a tilt unit 40 side, and FIG. 5B is a view of the tilt optical sensor 363 as viewed from a front side of the camera 100. The tilt optical sensor 363 comprises a substrate 363a, and a light-emitting portion 363b and a light-receiving portion array 363c, both being mounted on the substrate 363a. The light-emitting portion 363b emits light to the tilt reflection scale 42, and the light-receiving portion array 363c receives a reflected light from the tilt reflection scale 42. For example, a light-emitting diode is used for the light-emitting portion 363b, and a phototransistor is used for the light-receiving portion array 363c. Specifically, the light-receiving portion array 363c is comprised of a plurality of phototransistors arranged in a range to which a reflected light from the contrast patterns of the optical grid 42a resulting from light emitted from the light-emitting portion 363b is incident. The tilt optical sensor 363 receives the reflected light from the contrast patterns of the optical grid 42a using the light-receiving portion array 363c, and converts the received reflected light into an electric signal. The reflected light from the contrast patterns of the optical grid 42a forms an image of a reflective pattern, that is, a so called reflectance distribution image. The light-receiving portion array 363c subjects the reflectance distribution image to a photoelectrical conversion and outputs an electric signal having a waveform of sinusoid according to a light quantity distribution of the reflectance distribution image. In the camera 100, when the tilt reflection scale 42 and the tilt optical sensor 363 move relatively with each other, the reflectance distribution image formed by the reflected light from the contrast patterns of the optical grid 42a varies. By reading the electric signal having a waveform of sinusoid according to this change, the camera 100 detects a rotational position of the tilt unit 40. Then, a rotational direction of the tilt unit 40 is detected by reading varying of a direction of the reflected light incident from the optical grid 42a to the light-receiving portion array 363c.

Figure 6:
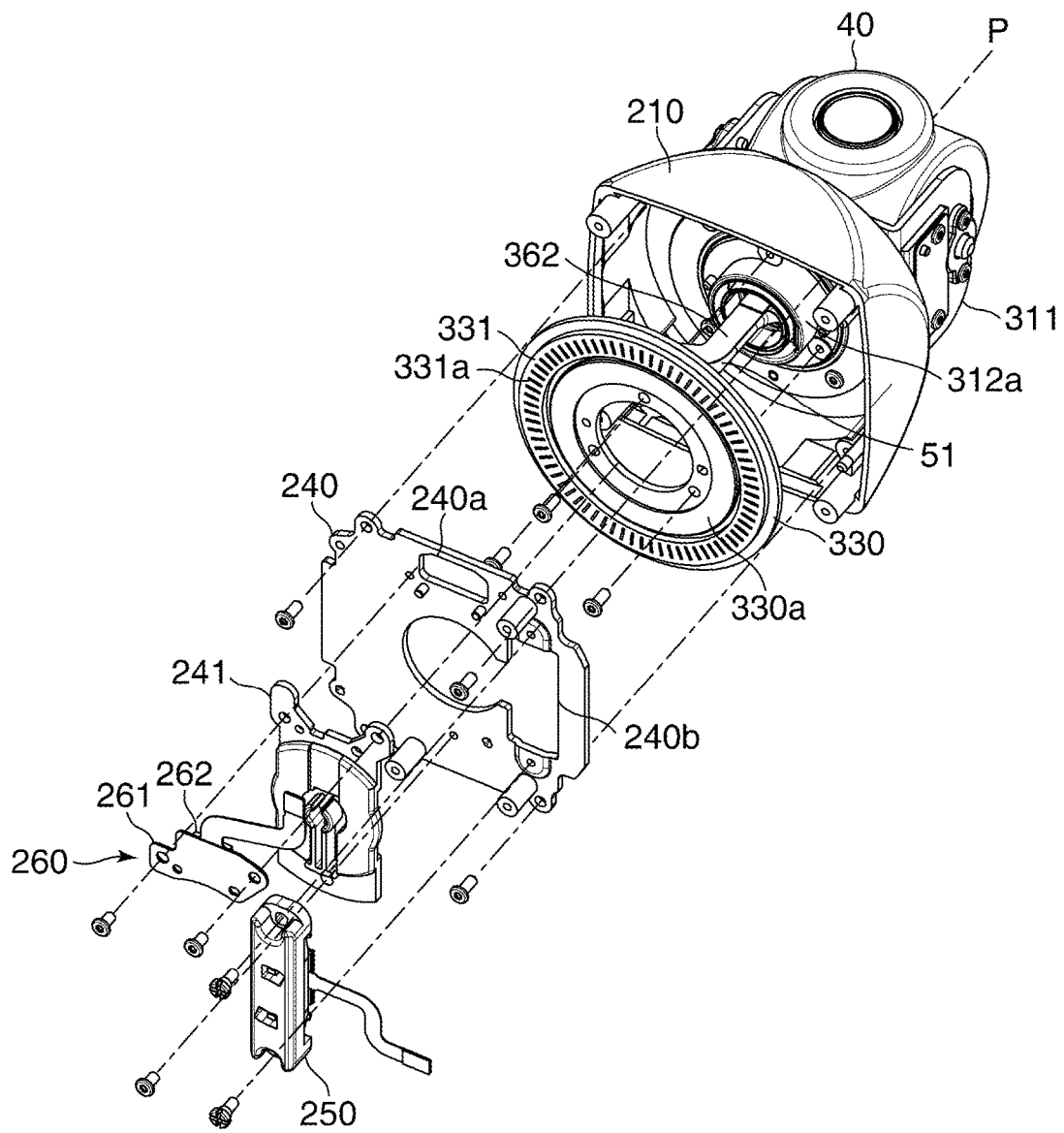
FIG. 6 is an exploded perspective view schematically showing an internal arrangement of a base unit.

FIG. 6 shows an exploded perspective view schematically showing an internal arrangement of the base unit 20. FIG. 6 also shows how to attach the pan unit 30 to which the tilt unit 40 is attached to the base cover 210. In a case where the pan unit 30 is attached to the base cover 210, a pan shaft portion 312a is fitted into a pan rotation supporting portion 210a, and the pan rotation supporting portion 210a is formed by mold-injecting a resin having low friction and superior sliding characteristics (for example, polyacetal (POM) and the like). It should be noted that a rolling bearing such as a ball bearing and a roller bearing may be used as the pan rotation supporting portion 210a. As a result, the pan unit 30 is supported by the base unit 20 in a smoothly rotatable (horizontally rotatable) manner about the axis P. A pan rotation plate 330 is fixed to the panning base 312 (pan shaft portion 312a) of the pan unit 30 from a bottom side of the camera 100 by screws with the axis P at its center. An annular plate-shaped pan reflection scale 331 (scale plate) is attached to the pan rotation plate 330 by a double-sided tape, not shown, with the axis P at its center. The pan reflection scale 331 is arranged close to an outer circumference of the pan rotation plate 330. After the pan rotation plate 330 and the pan reflection scale 331 are installed to the base cover 210, a main chassis 240 is installed from the bottom side of the camera 100 and fixed to the base cover 210 by screws. An opening 240a and an opening 240b as well as screw holes are formed in the main chassis 240. The opening 240b is comprised of a circular opening and a rectangular opening arranged adjacent to each other. The wiring 51 extending from the tilt unit 40 is inserted into the circular opening of the opening 240b via a wiring space S (wiring region), to be described later, and connected to the control substrate 220. The pan driving unit 250 (another actuator) which drives the pan unit 30, the panning position detecting unit 260 (position detecting unit) which detects rotation of the pan unit 30, and a cable holder 241 which holds the wiring 51 are attached to the main chassis 240. In the main chassis 240, the pan driving unit 250 is arranged so as to enter the rectangular opening of the opening 240b, and the panning position detecting unit 260 is arranged so that a part of a pan optical sensor 262 (to be described later) enters the opening 240a. At this time, the panning position detecting unit 260 is attached to the main chassis 240 while sandwiching a part of the cable holder 241. The pan driving unit 250 is an actuator comprised of an ultrasonic motor having the same arrangement as the tilt driving unit 350 described earlier. Accordingly, as to be described later, in the present embodiment, the pan driving unit 250 is in pressure contact with the pan rotation plate 330 fastened to the pan unit 30 in order to transmit the driving force.

Figure 7:
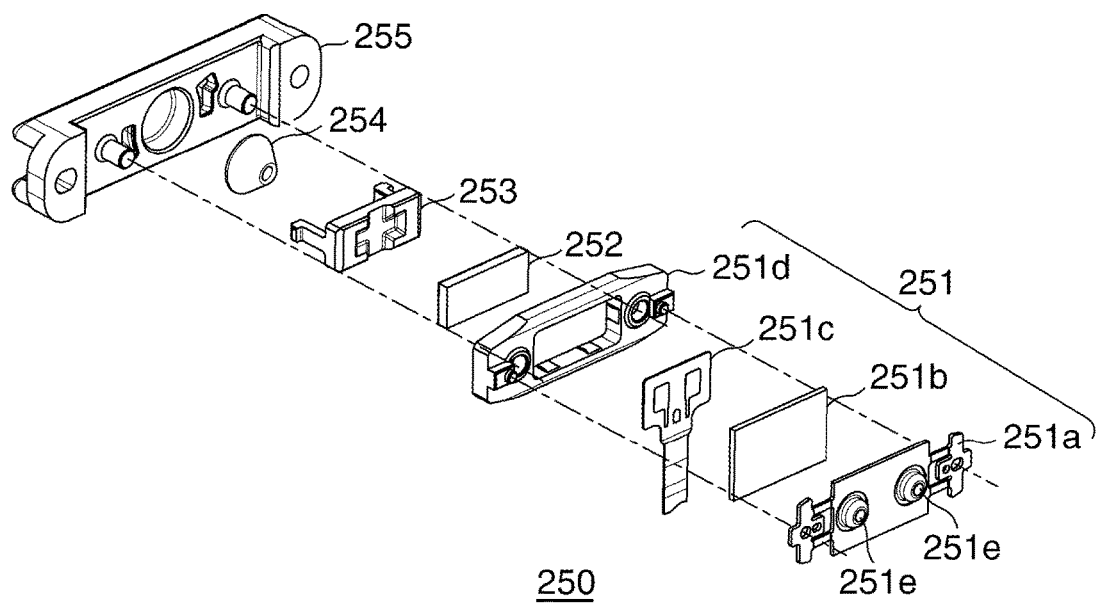
FIG. 7 is an exploded perspective view schematically showing an arrangement of a pan driving unit.

FIG. 7 is an exploded perspective view schematically showing an arrangement of the pan driving unit 250. In FIG. 7, the pan driving unit 250 has a driving unit 251, a felt 252, a presser 253, a spring 254, and a case 255 (fixing unit). The driving unit 251 has an oscillator 251a, a piezoelectric element 251b, an FPC 251c which is a wiring member, and a base member 251d. The piezoelectric element 251b gives ultrasonic vibration to the oscillator 251a, and the FPC 251c is adhesively fixed to the piezoelectric element 251b to apply a high frequency voltage to the piezoelectric element 251b. The base member 251d holds the oscillator 251a, the piezoelectric element 251b, and the FPC 251c, and brings the oscillator 251a into pressure contact with the pan rotation plate 330 when the pan driving unit 250 is attached to the main chassis 240. The FPC 251c is directly connected to the control substrate 220, and applies an arbitrary high frequency voltage to the piezoelectric element 251b depending on a control signal from the driver IC. The oscillator 251a has contact points 251e comprised of a plurality of projections. When the high frequency voltage is applied to the piezoelectric element 251b, vibration with an arbitral frequency is excited in the oscillator 251a, which generates a driving force to drive the driven body in an arrangement direction of the contact points 251e. Because the oscillator 251a is in pressure contact with the pan rotation plate 330, the driving force is transmitted to the pan rotation plate 330, and the pan unit 30 is relatively moved with respect to the pan driving unit 250.

In the pan driving unit 250, the case 255 is fixed to the main chassis 240 by screws, and the spring 254 supported by the case 255 presses the driving unit 251 via the felt 252 and presser 253. The presser 253 is arranged in an interior of the base member 251d of the driving unit 251, slidably moves in a direction parallel to the axis P, and transmits a local pressing force of the spring 254 over a wide range. Accordingly, in the pan driving unit 250, the oscillator 251a is pressed without being tilted, and the plurality of contact points 251e of the driving unit 251 is equally pressed against the pan rotation plate 330. The felt 252 is arranged between the presser 253 and the driving unit 251, attenuates vibration generated by the oscillator 251a, and prevents the vibration from being transmitted to the presser 253 and the spring 254. The pan driving unit 250 is attached to the main chassis 240 so that at least the contact points 251e enter the rectangular opening of the opening 240b of the main chassis 240.

An annular frictional sliding surface 330a is formed in a lower surface of the pan rotation plate 330 with the axis P at its center, and the contact points 251e are in pressure contact with the frictional sliding surface 330a. The frictional sliding surface 330a is subjected to a surface treatment such as lapping, and a highly flat and smooth plane is formed. Metal material such as stainless material subjected to a hardening treatment, for example, nitriding is used for the pan rotation plate 330. Accordingly, the pan rotation plate 330 achieves stable contact and low wear amount of the contact points 251e at the same time. It should be noted that a cementation process in which carbons are added to a surface of the frictional sliding surface 330a and hardened, for example, may be used as the hardening treatment for the pan rotation plate 330.

Referring again to FIG. 6, the panning position detecting unit 260 has a FPC 261, and a pan optical sensor 262 is mounted on the FPC 261. The FPC 261 is fixed to the main chassis 240 by screws so that a part of the pan optical sensor 262 enters the opening 240a of the main chassis 240. In this case, the FPC 261 is attached to the main chassis 240 so as to sandwich a part of the cable holder 241. As described above, on the lower surface of the pan rotation plate 330, the pan reflection scale 331 is arranged close to an outer circumference of the pan rotation plate 330. The panning position detecting unit 260 is attached to the main chassis 240 so that the pan optical sensor 262 and the pan reflection scale 331 face with each other with a predetermined space sandwiching therebetween. The FPC 261 is connected to the control substrate 220 and outputs a detection result of the pan optical sensor 262 to the CPU. The pan reflection scale 331 has an optical grid 331a (scale) comprised of a plurality of contrast patterns arranged in a circumference direction around the axis P (pan shaft portion 312a) at constant intervals. The frictional sliding surface 330a and the pan reflection scale 331 are coaxially arranged about the axis P, and the pan reflection scale 331 is arranged on an outer peripheral side of the pan rotation plate 330 further than the frictional sliding surface 330a. A resin such as acryl (PMMA) or polycarbonate (PC) is used for a base material of the pan reflection scale 331. In the pan reflection scale 331, the optical grid 331a comprised of an aluminum film, for example, is formed as a reflection film on a surface of the base material. It should be noted that the base material of the pan reflection scale 331 is not limited to the above materials, and quartz glass, blue sheet glass, or silicon wafer, for example, may be used for the base material. Chromium film, for example, may be used for the optical grid 331a.

Figure 8A:
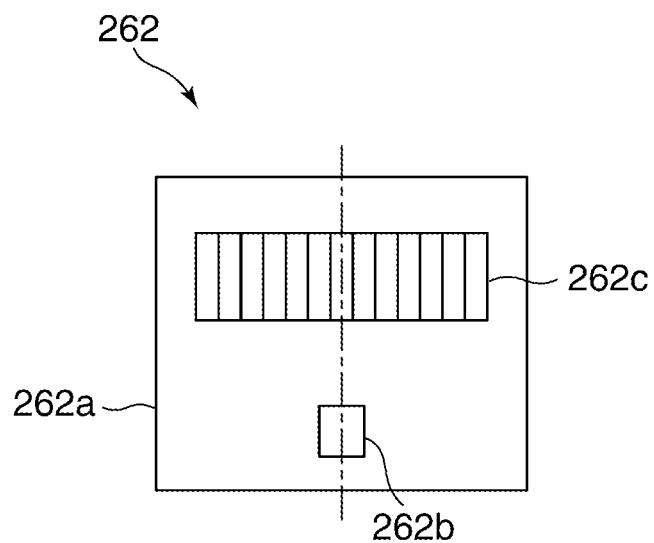
FIGS. 8A and 8B are views schematically showing an arrangement of a pan optical sensor of a panning position detecting unit.
Figure 8B:
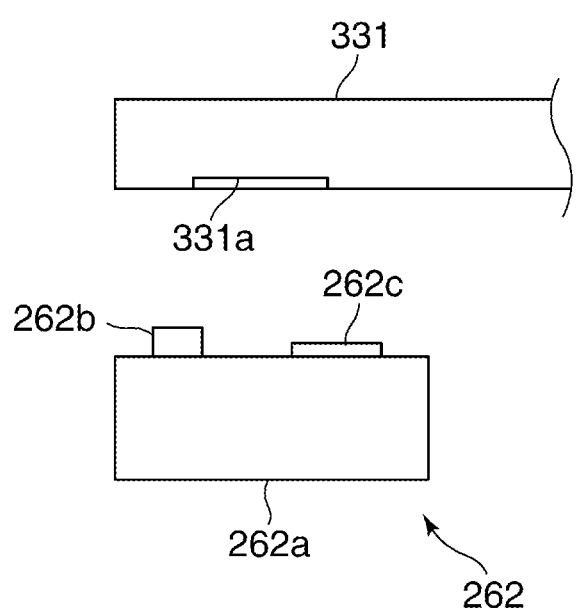

FIGS. 8A and 8B are views schematically showing an arrangement of the pan optical sensor 262 of the panning position detecting unit 260. FIG. 8A is a view of the pan optical sensor 262 as viewed from a pan unit 30 side, and FIG. 8B is a view of the pan optical sensor 262 as viewed from the front side of the camera 100. The pan optical sensor 262 comprises a substrate 262a, and a light-emitting portion 262b and a light-receiving portion array 262c, both being mounted on the substrate 262a. The light-emitting portion 262b emits light to the pan reflection scale 331, and the light-receiving portion array 262c receives a reflected light from the pan reflection scale 331. For example, a light-emitting diode is used for the light-emitting portion 262b and a phototransistor is used for the light-receiving portion array 262c. Specifically, the light-receiving portion array 262c is comprised of a plurality of phototransistors arranged in a range to which a reflected light from the contrast patterns of the optical grid 331a resulting from light emitted from the light-emitting portion 262b is incident. The pan optical sensor 262 receives the reflected light from the contrast patterns of the optical grid 331a using the light-receiving portion array 262c, and converts the received reflected light into an electric signal. The reflected light from the contrast patterns of the optical grid 331a forms an image of a reflective pattern, that is, a so called reflectance distribution image. The light-receiving portion array 262c subjects the reflectance distribution image to a photoelectrical conversion and outputs an electric signal having a waveform of sinusoid according to a light quantity distribution of the reflectance distribution image. In the camera 100, when the pan reflection scale 331 and the pan optical sensor 262 move relatively with each other, the reflectance distribution image formed by the reflected light from the contrast patterns of the optical grid 331a varies. By reading the electric signal having a waveform of sinusoid according to this change, the camera 100 detects a rotational position of the pan unit 30. Then, a rotational direction of the pan unit 30 is detected by reading varying of a direction of the reflected light incident from the optical grid 331a to the light-receiving portion array 262c.

Figure 9:
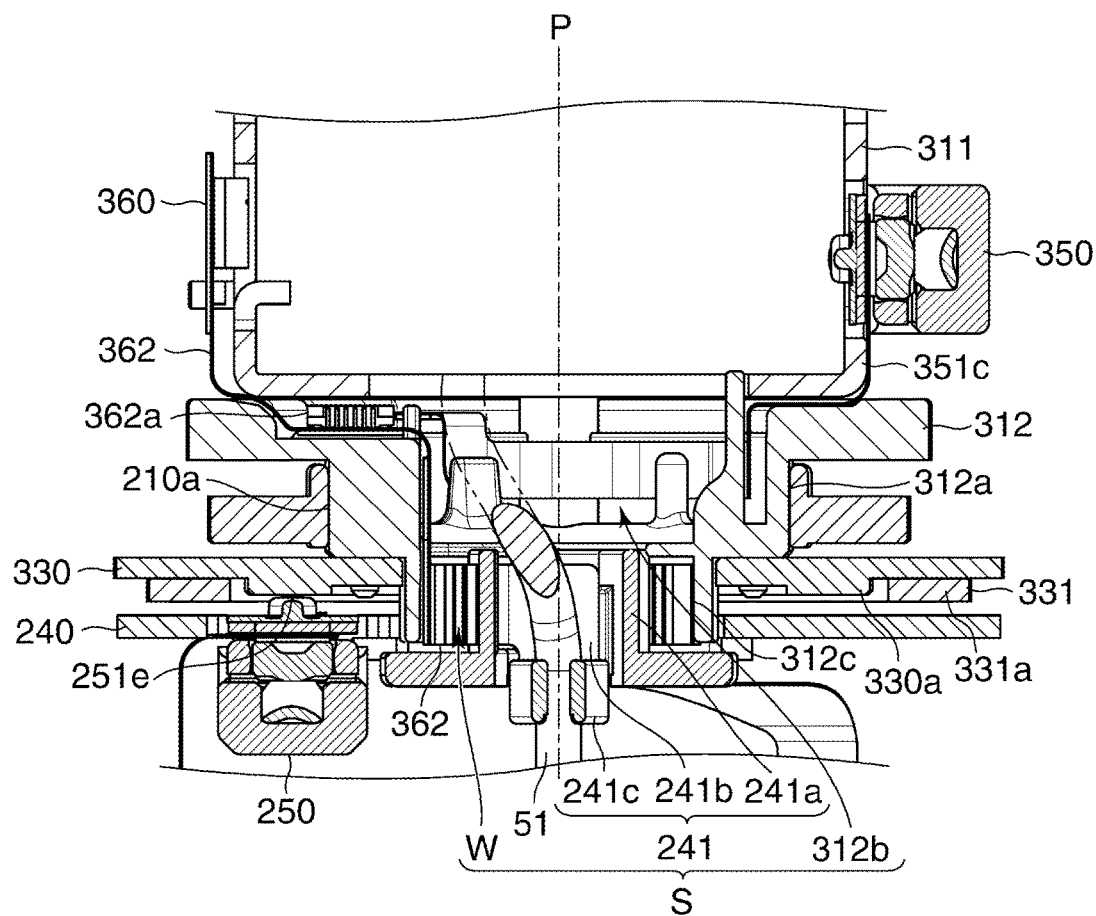
FIG. 9 is a partial enlarged cross-sectional view for use in explaining a wiring configuration in a vicinity of a pan shaft portion of a panning base.
Figure 10:
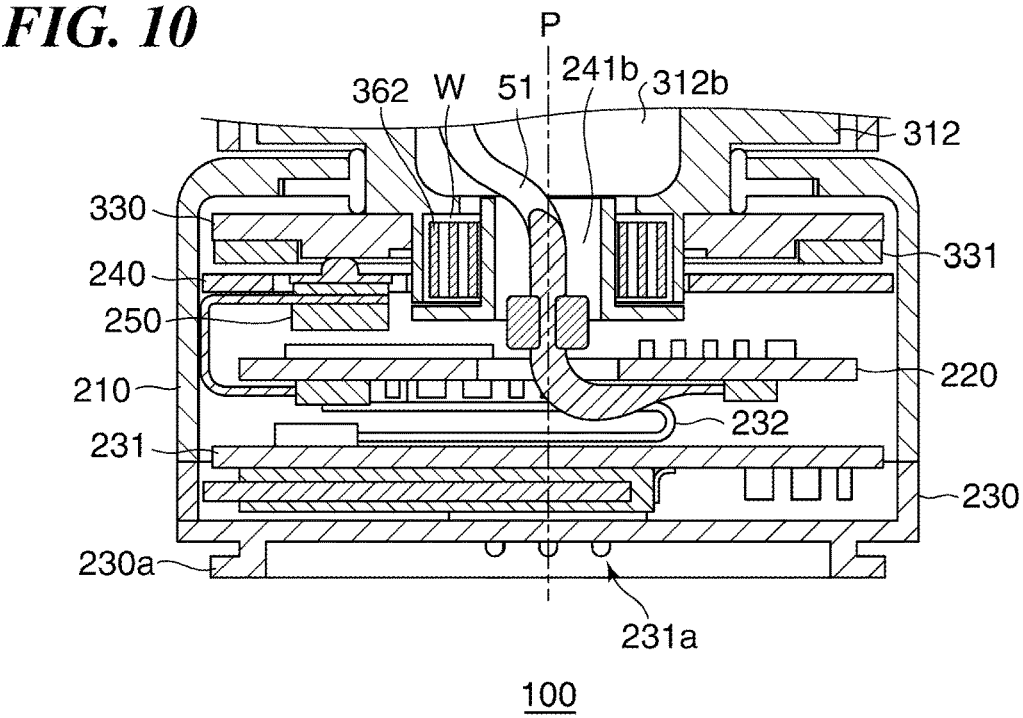
FIG. 10 is a partial enlarged cross-sectional view for use in explaining a wiring configuration in an interior of a base cover.

FIG. 9 is a partial enlarged cross-sectional view for use in explaining a wiring configuration in a vicinity of a pan shaft portion 312a of the panning base 312. FIG. 10 is a partial enlarged cross-sectional view for use in explaining a wiring configuration in an interior of the base cover 210.

In FIGS. 9 and 10, the tilt driving unit 350 and the tilting position detecting unit 360 are electrically connected with each other in the interior of the panning base 312. Specifically, the FPC 351c extends from the tilt driving unit 350, and a front end of the FPC 351c is connected to the connector 362a of the FPC 362. In the camera 100, the wiring space S is formed in a hollow portion inside the cylindrical pan shaft portion 312a, and the wiring 51, FPC 362, and the like are inserted into the wiring space S and connected to the control substrate 220. In the present embodiment, the wiring space S is divided into three spaces. Specifically, the wiring space S has an extra length accommodating space 312b (first region), an inserting space 241b, and an extra length accommodating space W (second region). When the tilt unit 40 is driven in the tilting direction and the panning direction, the wiring 51 follows a motion of the tilt unit 40, and hence an extra length portion becomes necessary for the wiring 51. The extra length portion of the wiring 51 bends depending on the motion of the tilt unit 40, and thus the extra length portion may unnecessarily occupy a space. In the camera 100, to cope this problem, the extra length accommodating space 312b which occupies substantially an upper half of an interior space of the cylindrical pan shaft portion 312a accommodates the extra length portion of the wiring 51. The FPC 351c is wired along an outer circumference of the extra length accommodating space 312b and connected to the connector 362a.

The cable holder 241 is arranged immediately below the extra length accommodating space 312b. The cable holder 241 has a cylindrical wall portion 241a which protrudes upwardly in the figure along the axis P. The cable holder 241 is installed to the main chassis 240 so that the wall portion 241a is inserted into the interior space of the pan shaft portion 312a and faces the extra length accommodating space 312b. The inserting space 241b which vertically penetrates the cable holder 241 is formed inside of the wall portion 241a, and the wiring 51 is inserted into the inserting space 241b and connected to the control substrate 220. The cable holder 241 has a cable holding portion 241c arranged at a lower end of the inserting space 241b, and the cable holding portion 241c fixedly holds the wiring 51 inserted into the inserting space 241b. The cable holding portion 241c has an arc-shaped arm portion which sandwiches the wiring 51. The cable holding portion 241c is arranged on the axis P and holds the wiring 51 along the axis P. Accordingly, when the pan unit 30 horizontally rotates, the wiring 51 is merely twisted about the axis P and does not excessively bend, and thus a space occupied by the wiring 51 can be reduced. Namely, the extra length accommodating space 312b and the inserting space 241b can be reduced. The wiring 51 is not irregularly deformed since it does not unnecessarily bend. Accordingly, disconnection of the wiring 51 due to repeatedly performed irregular deformation can be prevented from occurring.

Between the wall portion 312c of the pan shaft portion 312a and the wall portion 241a of the cable holder 241, the extra length accommodating space W, which is an annular space, is formed so as to surround the inserting space 241b. When the pan unit 30 horizontally rotates, the FPC 362 follows a horizontal rotation of the pan unit 30, and hence an extra length portion becomes necessary for the FPC 362. The extra length portion of the FPC 362 bends depending on the motion of the pan unit 30, which may unnecessarily occupy a space. In the camera 100, to cope this problem, the extra length accommodating space W accommodates the extra length portion of the FPC 362. Specifically, the FPC 362 is wound around the wall portion 241a of the cable holder 241 for a plurality of times in the extra length accommodating space W. One end of the extra length portion of the FPC 362 is adhesively fixed to the panning base 312 by, for example, a double-sided tape, not shown, and the another end of the extra length portion of the FPC 362 is adhesively fixed to the cable holder 241 by, for example, a double-sided tape, not shown. Accordingly, even if the pan unit 30 horizontally rotates, the extra length portion of the FPC 362 is merely loosen or fastened in a wounded state in the extra length accommodating space W, and does not bent outside the extra length accommodating space W. The FPC 362 is not irregularly deformed since it does not bend. Accordingly, disconnection of the FPC 362 due to repeatedly performed irregular deformation can be prevented from occurring.

The pan rotation plate 330 is fastened to the panning base 312 outside of the wall portion 312c. Accordingly, the pan rotation plate 330 as well as the panning base 312 is rotatably held by the base unit 20. The panning position detecting unit 260 is arranged in such a way that the panning position detecting unit 260 is rotated and moved by a predetermined angle about the axis P with respect to the pan driving unit 250 when viewed along the axis P.

In the camera 100, when viewed along the axis P, it is preferable that a distance (hereinafter, referred to as "the driving radius") from the axis P to the contact points 251e of the pan driving unit 250 is shorter. Accordingly, a moving angle of the pan unit 30 per one oscillation of the contact points 251e becomes large, and thus a rotational moving speed of the pan unit 30 is increased. In this case, the driving radius is determined in light of frictional load on the pan rotation supporting portion 210a and the pan shaft portion 312a, a weight of the pan unit 30, a wiring configuration of the wiring 51 and sliding frictional load while the pan unit 30 is rotating, and a driving force which the pan driving unit 250 is able to generate. Moreover, when viewed along the axis P, it is preferable that a distance (hereinafter referred to as "the detecting radius") from the axis P to a detecting point at which the pan optical sensor 262 detects a reflected light from the optical grid 331a is longer. Accordingly, an amount of rotational movement of the pan unit 30 per a movement angle unit at the detecting point is increased, and thus an accuracy of the reflectance distribution image obtained by the pan optical sensor 262 is improved. In this case, the detecting radius is determined in light of a maximum diameter of the pan reflection scale 331 which can be accommodated in the base cover 210. In the camera 100, the pan reflection scale 331 is arranged closer to the outer periphery of the pan rotation plate 330, and hence the detecting radius is larger than the driving radius. Accordingly, a high-speed panning operation and improvement in accuracy of pan rotation detection can be achieved at the same time.

In the present embodiment, the wiring 51 and the FPC 362 are inserted into the wiring space S formed in the hollow portion inside the cylindrical pan shaft portion 312a of the pan unit 30 and connected to the control substrate 220. Accordingly, necessity to draw the wiring 51 and the FPC 362 from a side of the pan unit 30 can be dispensed with. As a result, when the pan unit 30 horizontally rotates, the drawn wiring 51 and the FPC 362 do not bend such as to unnecessarily occupy a space. Namely, the camera 100 can be downsized when viewed along the axis P compared to a case where the wiring 51 and the FPC 362 are drawn from the side of the pan unit 30. Further, in the camera 100, the extra length portion of the wiring 51 is accommodated in the extra length accommodating space 312b, and the extra length portion of the FPC 362 is accommodated in the extra length accommodating space W. Accordingly, the extra length portions are provided in the wiring 51 and the FPC 362 respectively, and thus the wiring 51 and the FPC 362 can follow horizontal rotation of the tilt unit 40.

It should be noted that the control substrate 220 and the bottom cover 230 are attached to the base cover 210 after the pan unit 30 and the tilt unit 40 are attached to the base cover 210, whereby an assembly of the camera 100 is completed.

Figure 11:
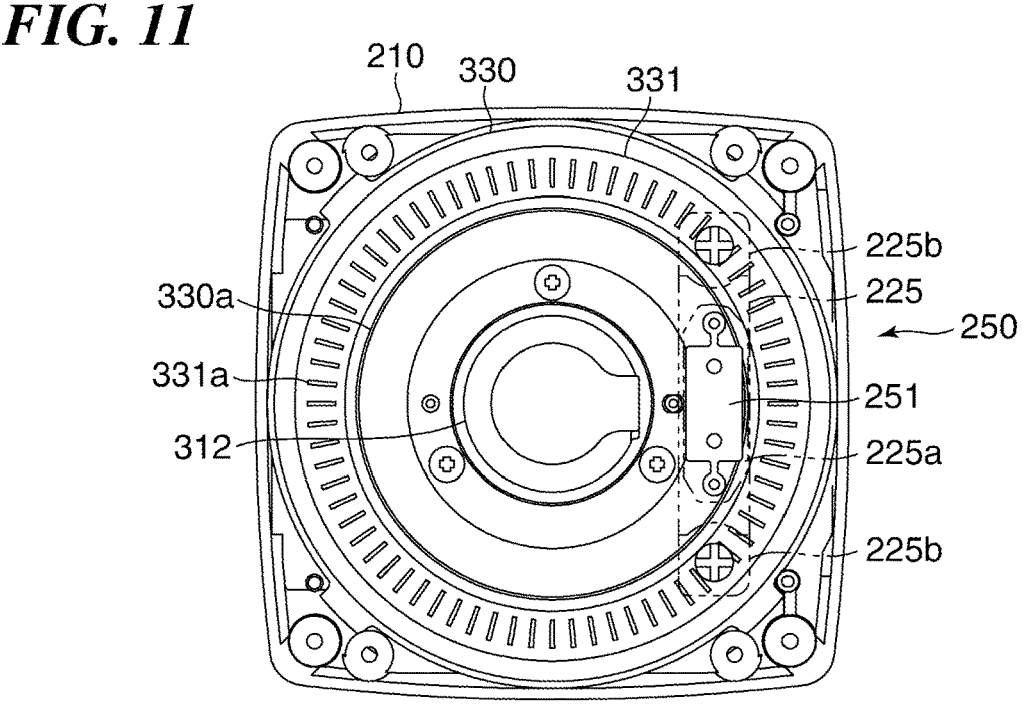
FIG. 11 is a view for use in explaining a state before a control substrate and a bottom cover are attached to the base cover.

FIG. 11 is a view for use in explaining a state before a control substrate 220 and a bottom cover 230 are attached to the base cover 210. In FIG. 11, the pan driving unit 250 is fixed to the main chassis 240 so that the driving unit 251 faces the frictional sliding surface 330a. The pan driving unit 250 has the case 255 which exhibits a substantially rectangular shape in a plan view. The case 255 has an accommodating portion 255a comprised of a concave portion which accommodates component elements of the pan driving unit 250, and two fixing end portions 255b arranged on both ends of the accommodating portion 255a. The case 255 presses the component elements in well balance by fixing the fixing end portions 255b to the main chassis 240 by screws. As a result, the plurality of contact points 251e of the driving unit 251 is equally pressed against the pan rotation plate 330. Since the accommodating portion 255a needs to accommodate the component elements, a thickness of the pan driving unit 250 in a vicinity of the accommodating portion 255a is large. On the other hand, since the fixing end portions 255b do not need to accommodate the component elements, a thickness of the pan driving unit 250 in a vicinity of the fixing end portions 255b is small. Moreover, since the pan reflection scale 331 is attached to the pan rotation plate 330, a thickness of the pan rotation plate 330 in a vicinity of the pan reflection scale 331 is large. On the other hand, since nothing is attached to the frictional sliding surface 330a, a thickness of the pan rotation plate 330 in a vicinity of the frictional sliding surface 330a is small. In the camera 100, when the pan driving unit 250 is fixed to the main chassis 240, the vicinity of the accommodating portion 255a of the pan driving unit 250 having a large thickness is arranged in such a way that the vicinity of the accommodating portion 255a of the pan driving unit 250 lies on the vicinity of the frictional sliding surface 330a of the pan rotation plate 330 having a small thickness. The vicinity of the fixing end portions 255b of the pan driving unit 250 having a small thickness are arranged in such a way that the vicinity of the fixing end portions 255b of the pan driving unit 250 lies on the vicinity of the pan reflection scale 331 of the pan rotation plate 330 having a large thickness. Accordingly, a space occupied by the pan rotation plate 330 and the pan driving unit 250 can be small, thereby the camera 100 can be downsized.

Referring again to FIG. 10, in camera 100, the control substrate 220 has a plurality of connectors (not shown), and the wiring 51, the FPC 362 and so on are connected to the connectors, respectively. The recording portion 231 of the bottom cover 230 has a connector for connecting the FPC, and one end of the FPC 232 is connected to the connector. After another end of the FPC 232 is connected to the connector of the control substrate 220, the bottom cover 230 is fixed to the base cover 210 by screws. Battery contacts 231a are mounted on a lower part of the recording portion 231 of the bottom cover 230. An opening is formed in the bottom cover 230 so as to face the battery contacts 231a, and tip portions of the battery contacts 231a are exposed from the opening. In the camera 100, an external power source (now shown) is mounted on the bottom cover 230. For example, a battery pack having an alkaline secondary battery or a lithium-ion secondary battery is used as the external power source. An installing portion 230a for the external power source is formed in the bottom cover 230, and when the external power source is fixed to the installing portion 230a, electric contacts of the external power source side are brought into contact with the battery contacts 231a, and power is supplied to the camera 100. It should be noted that the external power source may be mounted on the main body of the drone 10. In this case, when the camera 100 is mounted on the drone 10, the battery contacts 231a are brought into contact with electric contacts (not shown) formed on the lower part of the drone 10, and power is supplied from the drone 10 to the camera 100.

It should be noted that in the present embodiment, although the pan base 310 is comprised of the pan chassis 311 formed by the plate metal and the panning base 312 formed of resin, the pan chassis 311 and the panning base 312 may be integrally formed of a high-strength resin material.

Figure 12A:
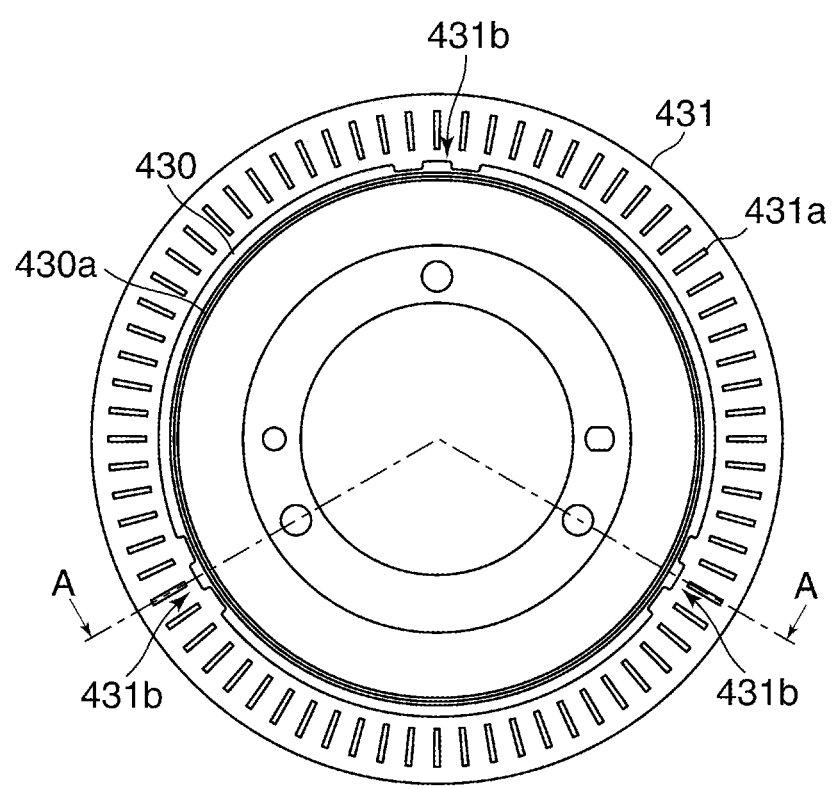
FIGS. 12A and 12B are views for use in explaining a variation of a pan rotation plate and a pan reflection scale.
Figure 12B:
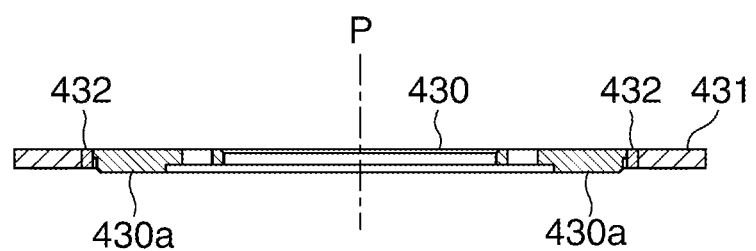
Figure 13A:
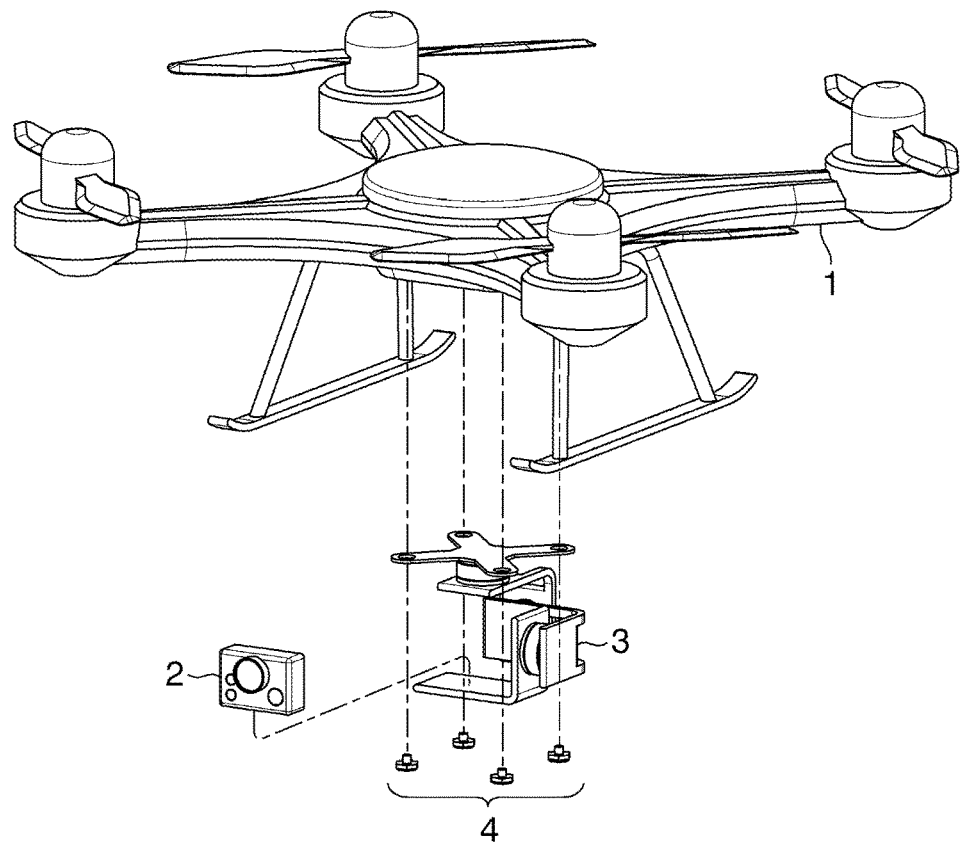
FIGS. 13A and 13B are views showing how to mount a conventional compact camera to a drone.
Figure 13B:
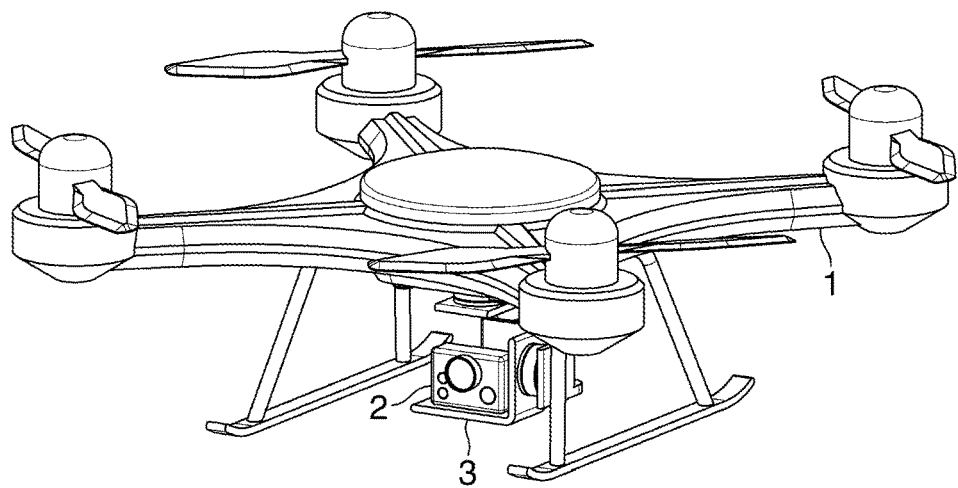

FIGS. 12A and 12B are views for use in explaining a pan rotation plate 430 and a pan reflection scale 431 as a variation of the pan rotation plate 330 and the pan reflection scale 331. In particular, FIG. 12A shows the pan rotation plate 430 and the pan reflection scale 431 as viewed from a bottom side, and FIG. 12B shows a cross-section along a line A-A in FIG. 12A. Hereinafter, a description will be given of an arrangement different from that of the pan rotation plate 330 and the pan reflection scale 331. In a lower surface of a pan rotation plate 430 having the substantially same arrangement as the pan rotation plate 330, an annular frictional sliding surface 430a is formed with the axis P at its center. The pan reflection scale 431 having the substantially same arrangement as the pan reflection scale 331 has an optical grid 431a comprised of a plurality of contrast patterns arranged in a circumferential direction around the axis P at regular intervals. When viewed along the axis P, the pan rotation plate 430 is arranged so as to be included in an inside of the pan reflection scale 431, and a part of an inner peripheral portion of the pan reflection scale 431 overlaps with a part of an outer peripheral portion of the pan rotation plate 430. Specifically, a plurality of pairs of protruding portions 431b is formed in a circumferential direction in the outer peripheral portion of the pan reflection scale 431 at regular intervals. The protruding portions 431b are wedge-shaped protruding pieces which protrude toward the axis P. An ultraviolet-curing adhesive, for example, is applied to a range 432 of each of the protruding portions 431b, the protruding portions 431b are attached to the outer peripheral portion of the pan rotation plate 430, and then the adhesive is cured through exposure to ultraviolet light to fix the pan reflection scale 431 to the pan rotation plate 430. After that, the pan rotation plate 430 is fixed to the panning base 312 by screws. By constructing each of the protruding portions 431b to which the adhesive is applied is formed by the wedge-shaped protruding piece, the adhesive can be made easier to remain on the protruding portions 431b. By applying the adhesive only to the protruding portions 431b, an amount of application of the adhesive can be reduced, and thus a curing time of the adhesive can be reduced to improve productivity of the camera 100.

The detection of rotation of the pan unit 30 using the pan reflection scale 431 is performed in a non-contact manner, no load acts on the pan reflection scale 431. Therefore, it is unnecessary to firmly attach the pan reflection scale 431 to the pan rotation plate 430, and specifically, it is unnecessary to attach the pan reflection scale 431 to the pan rotation plate 430 by using a fastening member such as screws. Accordingly, a thickness of the pan rotation plate 430 and the pan reflection scale 431 at assembly can be small, which contributes to downsize the camera 100. The adhesive used for fixing the pan reflection scale 431 is not limited to the ultraviolet-curing adhesive, and a variety of adhesives such as heat-curing adhesive can be used. Further, protruding portions similar to the protruding portions 431b may be provided on the outer peripheral portion of the pan rotation plate 430 instead of the protruding portions 431b in the pan reflection scale 431.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110106, filed Jun. 2, 2017 which is hereby incorporated by reference herein in its entirety.

What is claimed is:

1. An image pickup apparatus comprising an image pickup unit, a supporting unit that supports the image pickup unit, and a base unit on which the supporting unit is provided in a standing manner,
wherein the base unit has a control substrate, an actuator that drives the supporting unit, and a position detecting unit that detects a rotational position of the supporting unit,
the supporting unit has a cylindrical shaft portion, and a disk-shaped rotation plate and an annular scale plate arranged with the shaft portion at their center,
the base unit rotatably supports the supporting unit by fitting the shaft portion into a hole of the base unit,
wiring drawn from the image pickup unit is inserted into a wiring region comprised of a hollow portion of the shaft portion and connected to the control substrate,
the rotation plate has an annular sliding surface formed with the shaft portion at its center, and the scale plate has a plurality of scales arranged in a circumferential direction with the shaft portion at its center,
the actuator is arranged so as to be brought into pressure contact with the sliding surface,
the position detecting unit reads the scale, and
the scale plate is arranged at an outer peripheral side in the rotation plate.

2. The image pickup apparatus according to claim 1,
wherein the supporting unit has another actuator that drives the image pickup unit, and
another wiring drawn from the another actuator is inserted into the wiring region and connected to the control substrate.

3. The image pickup apparatus according to claim 2,
wherein the wiring region is divided into at least two regions comprised of a first region and a second region,
the first region includes a rotational axis of the supporting unit,
the second region is formed to surround the first region,
the wiring is inserted into the first region, and the another wiring is arranged in a wounded manner in the second region.

4. The image pickup apparatus according to claim 3, wherein the wiring is inserted into the first region so as to be along the rotational axis of the supporting unit.

5. The image pickup apparatus according to claim 1,
wherein the actuator has a driving unit that transmits a driving force to the sliding surface, and a fixing unit to which the driving unit is attached, and
when viewed along a rotational axis of the supporting unit, the driving unit is arranged so as to overlap with the sliding surface and not to overlap with the scale, and both ends of the fixing unit are arranged so as to overlap with the scale.

6. The image pickup apparatus according to claim 5, wherein the driving unit has an oscillator, a piezoelectric element that excites vibration in the oscillator, and a wiring member that supplies power to the piezoelectric element, and
by the vibration excited in the oscillator, the driving unit causes the sliding surface to move relatively to the oscillator.

7. The image pickup apparatus according to claim 1, wherein when viewed along a rotational axis of the supporting unit, at least a part of an outer peripheral portion of the rotation plate overlaps with at least a part of an inner peripheral portion of the scale plate, and the scale plate is fixed to the rotation plate.

8. An apparatus, comprising:
a moving body;
an image pickup apparatus according to claim 1 mounted on the moving body.

9. The apparatus according to claim 8, wherein the moving body comprises a flying mechanism,
wherein the image pickup apparatus is configured to pick up an image while the moving body is flying.

10. An image pickup apparatus comprising:
an image pickup unit;
a supporting unit that supports the image pickup unit;
a control substrate;
an actuator that drives the supporting unit; and
a detecting unit that detects a rotational amount of the supporting unit,
wherein the supporting unit has a shaft portion and a disk-shaped rotation plate arranged with the shaft portion at their center,
wiring drawn from the image pickup unit is inserted into a wiring region comprised of a hollow portion of the shaft portion and connected to the control substrate,
the rotation plate has an annular sliding surface formed with the shaft portion at its center, and
the actuator has a vibrator which includes contact points brought into contact with the annular sliding surface, a piezoelectric element, and a pressure unit, the vibrator causing a relative movement of the image pickup unit by driving of the piezoelectric element, the pressure unit pressing the contact points against the annular sliding surface.

11. The image pickup apparatus according to claim 10, wherein the supporting unit has another actuator that drives the image pickup unit, and
another wiring drawn from the another actuator is inserted into the wiring region and connected to the control substrate.

12. The image pickup apparatus according to claim 11,
wherein the wiring region is divided into at least two regions comprised of a first region and a second region,
the first region contains a rotational axis of the supporting unit,
the second region exists such as to surround the first region,
the wiring is inserted into the first region, and
the another wiring is arranged in a wounded manner in the second region.

13. The image pickup apparatus according to claim 12, wherein the wiring is inserted into the first region so as to be along the rotational axis of the supporting unit.

14. The image pickup apparatus according to claim 11,
wherein the another actuator has another vibrator which includes other contact points brought into contact with a surface of the image pickup unit, another piezoelectric element, and another pressure unit, the another vibrator causing a relative movement of the image pickup unit by driving of the another piezoelectric element, the another pressure unit pressing the contact points against the surface.

15. An apparatus, comprising:
a moving body;
an image pickup apparatus according to claim 10 mounted on the moving body.

16. The apparatus according to claim 15, wherein the moving body comprises a flying mechanism,
wherein the image pickup apparatus is configured to pick up an image while the moving body is flying.

17. The image pickup apparatus according to claim 10, wherein the shaft portion is a cylindrical shaft portion.

* * * * *